(12) United States Patent
Asao et al.

(10) Patent No.: US 6,621,190 B1
(45) Date of Patent: *Sep. 16, 2003

(54) ROTOR FOR AN AUTOMOTIVE ALTERNATOR

(75) Inventors: Yoshihito Asao, Tokyo (JP); Kyoko Higashino, Tokyo (JP); Katsumi Adachi, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/281,059

(22) Filed: Mar. 9, 1999

(30) Foreign Application Priority Data

Sep. 4, 1998 (JP) ............................................. 10-251490

(51) Int. Cl.⁷ .......................... H02K 1/22; H02K 17/00; H02K 7/00; H02K 5/24; H02K 21/12
(52) U.S. Cl. ......................... 310/263; 310/208; 310/71; 310/51; 310/91; 310/156.66
(58) Field of Search .............................. 310/91, 156.66, 310/261, 263, 256, 194, 180, 179, 42, 51, 152, 71; 29/596, 598

(56) References Cited

U.S. PATENT DOCUMENTS

| 302,319 A | * | 7/1884 | Brush .......................... 310/268 |
| 1,822,261 A | * | 9/1931 | Apple .......................... 310/201 |
| 3,320,788 A | * | 5/1967 | Meier ........................... 72/224 |
| 3,868,766 A | * | 3/1975 | Gramlich et al. ............ 310/208 |
| 5,174,013 A | * | 12/1992 | Hiroshima et al. ........... 29/605 |
| 5,243,248 A | * | 9/1993 | Benford et al. .............. 310/256 |
| 5,361,011 A | * | 11/1994 | York ........................... 310/194 |
| 5,539,265 A | * | 7/1996 | Harris et al. ................. 310/263 |
| 5,714,822 A | | 2/1998 | Kawano et al. ............. 310/179 |
| 5,892,313 A | * | 4/1999 | Harris et al. ................. 310/263 |
| 6,037,694 A | * | 3/2000 | Asao et al. .................. 310/164 |

FOREIGN PATENT DOCUMENTS

JP    2-243468    9/1990

OTHER PUBLICATIONS

Keljik; Electric Motors and Motor Controls; 1995; Delmar; pp. 139–142.*

* cited by examiner

*Primary Examiner*—Nestor Ramirez
*Assistant Examiner*—Guillermo Perez
(74) *Attorney, Agent, or Firm*—Sughrue Mion, PLLC

(57) ABSTRACT

A rotor for an automotive alternator comprises a cylindrical bobbin fitted over the base portions of a pair of field cores having a cylindrical portion and a pair of first and second annular flange portions projecting perpendicularly from both ends of the cylindrical portion, and a field winding wound a predetermined number of turns into multiple layers on the cylindrical portion of the bobbin, wherein the field winding has a flat shape in which a pair of opposite flat surfaces are parallel, the field winding being wound onto the cylindrical portion of the bobbin such that the pair of opposite flat surfaces face the inner circumferential side and the outer circumferential side, respectively, relative to the radial direction.

3 Claims, 7 Drawing Sheets

ROTOR FOR AN AUTOMOTIVE ALTERNATOR

BACKGROUND OF THE INVENTION

1. Field of the Invention

The present invention relates to a rotor for an automotive alternator, which has a Lundell-type field core, for mounting on an automobile engine, and in particular, relates to a winding configuration for winding onto the Lundell-type field core.

2. Description of the Related Art

Figure 6:
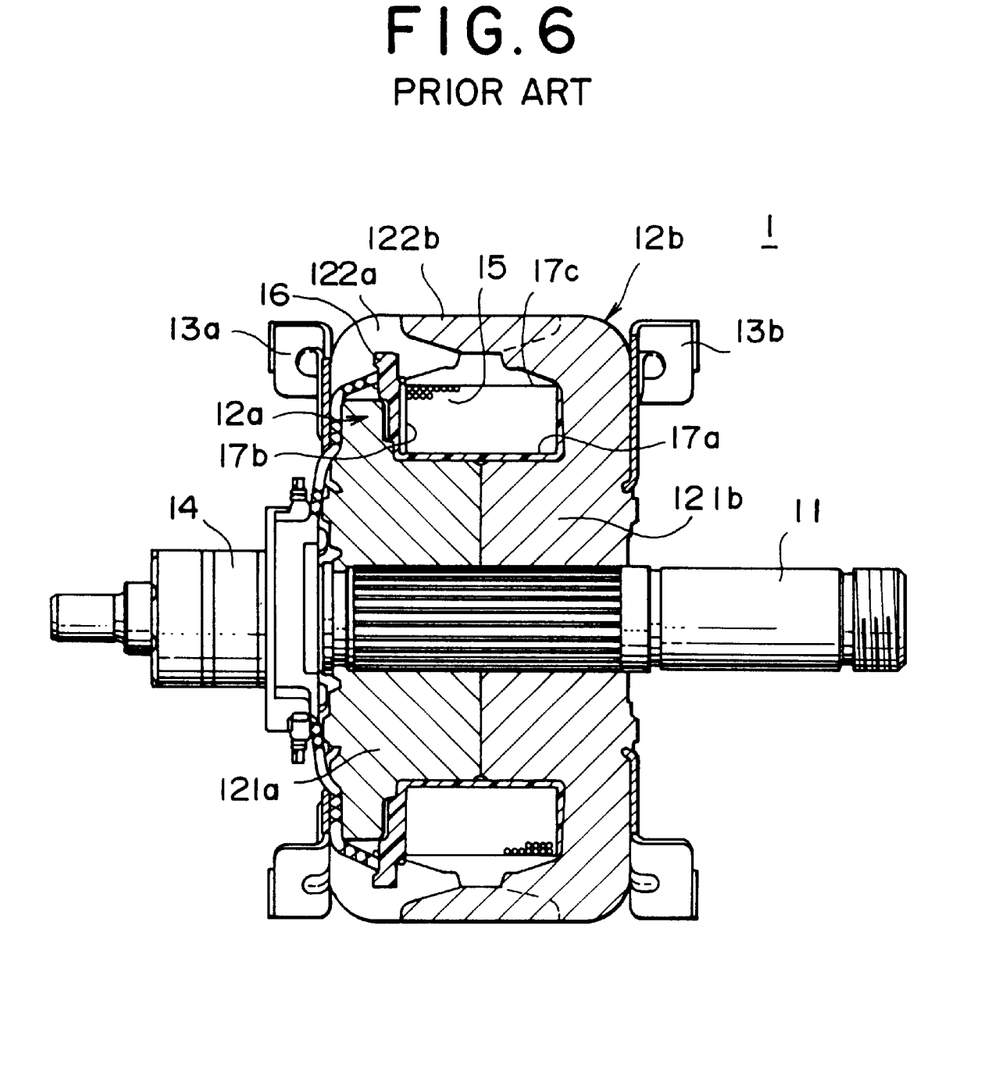
FIG. 6 is a cross-section of a conventional rotor for an automotive alternator.
Figure 7:
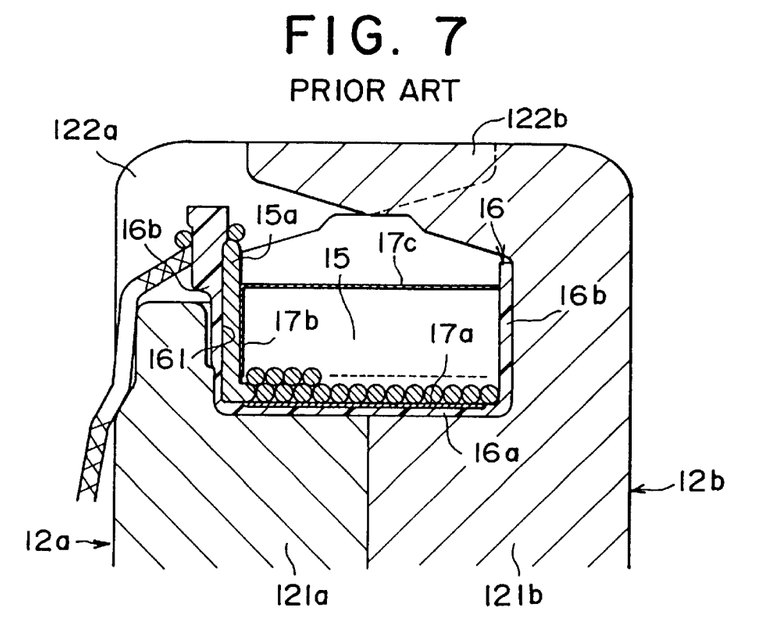
FIG. 7 is a partial cross-section of the conventional rotor for an automotive alternator.

FIG. 6 is a cross-section of a conventional rotor for an automotive alternator and FIG. 7 is a cross-section of part of the rotor shown in FIG. 6.

In FIGS. 6 and 7, a rotor 1 comprises a rotating shaft 11 rotatably supported by a pair of brackets (not shown), a pair of Lundell-type field cores 12a, 12b secured to the rotating shaft 11, a pair of fans 13a, 13b secured to both axial ends of the field cores 12a, 12b, slip rings 14 secured to one end of the rotating shaft 11, and a field winding 15 wound onto the field cores 12a, 12b.

The field cores 12a, 12b are made of iron, comprise cylindrical base portions 121a, 121b fitted over and secured to the rotating shaft 11 and claw-shaped magnetic poles 122a, 122b plurally projecting from the outer circumferential edges of the base portions 121a, 121b, and are secured to the rotating shaft 11 facing each other such that the end surfaces of the base portions 121a, 121b are in close contact with each other and the claw-shaped magnetic poles 122a, 122b intermesh alternately. The field winding 15 is a copper wire with a circular cross-section and is wound a predetermined number of times onto a bobbin 16 fitted over the outer circumferences of the base portions 121a, 121b. A magnetic flux is generated when an electric current is supplied to the field winding 15 by means of the slip rings 14 and magnetic poles are formed in the field cores 12a, 12b by the magnetic flux.

Inner circumferential tape 17a for protecting the winding is wound onto the cylindrical portion 16a of the bobbin 16. Outer circumferential tape 17c for protecting the winding is also wound onto the outer circumference of the field winding 15 wound onto the bobbin 16. In addition, side tape 17b is disposed between the lead portion of the field winding 15 and the multi-layered portion of the field winding 15.

Figure 9:
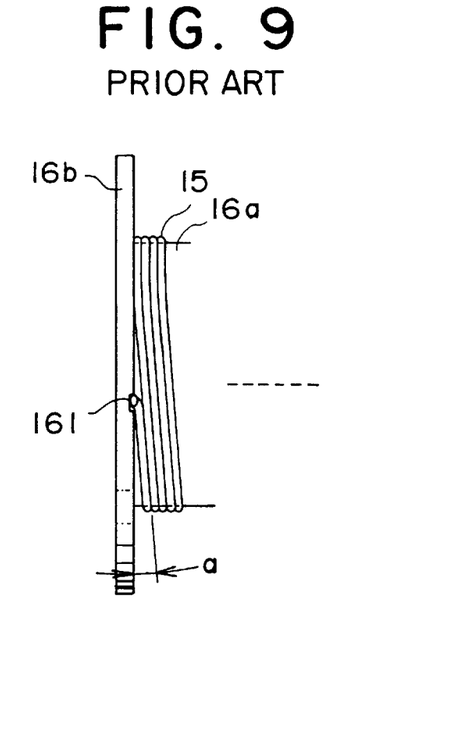
FIG. 9 is a side elevation explaining the method of winding the field winding in the conventional rotor for an automotive alternator.
Figure 10:
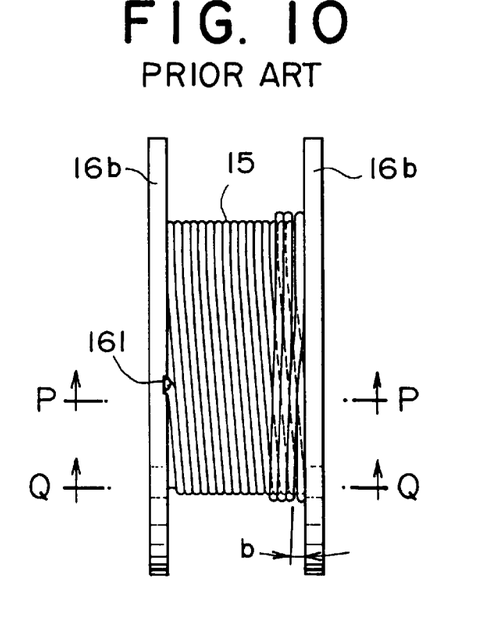
FIG. 10 is a side elevation explaining the method of winding the field winding in the conventional rotor for an automotive alternator.

The construction of the field winding 15 will now be explained with reference to FIGS. 8 to 10.

Figure 8:
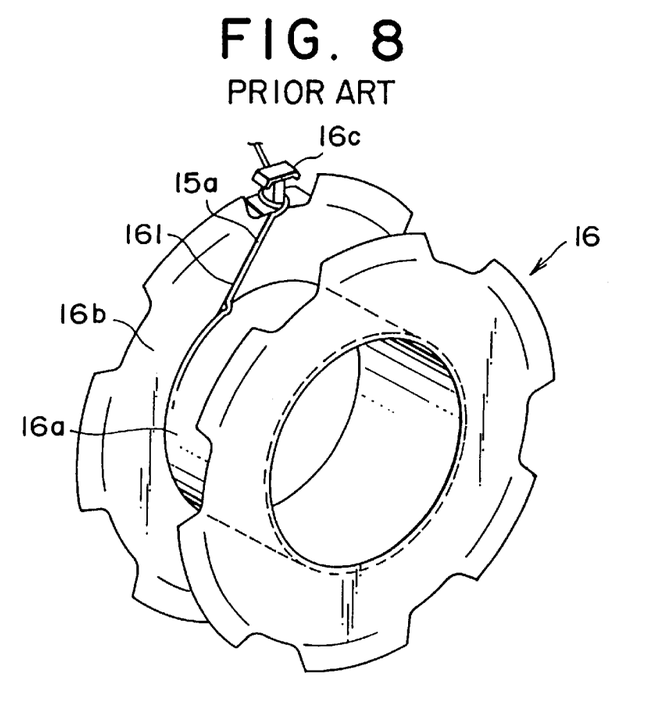
FIG. 8 is a perspective view of a bobbin used in the conventional rotor for an automotive alternator.

The bobbin 16 is made of resin, and as shown in FIG. 8, comprises a cylindrical portion 16a and a pair of first and second annular flange portions 16b projecting perpendicularly from both ends of the cylindrical portion 16a. A recessed groove 161 for housing a lead wire 15a at the start of the winding is disposed radially in the inner surface of the first flange portion 16b so as to extend from the outer circumferential side thereof to the cylindrical portion 16a. An anchor portion 16c is disposed on an outer circumferential portion of the first flange portion 16b in close proximity to the upper end of the recessed groove 161.

First, the inner circumferential tape 17a is wound onto the cylindrical portion 16a of the bobbin 16. Then, the starting portion of the field winding 15 is wound around the anchor portion 16c, inserted into the recessed groove 161, and drawn from the lower end (inner circumferential end) of the recessed groove 161 onto the cylindrical portion 16a. At this point, the side tape 17b is pasted onto the inner surface of the first flange portion 16b so as to cover the lead wire 15a at the start of the field winding 15 which is housed in the recessed groove 161. Then, as shown in FIG. 9, the field winding 15 drawn out onto the cylindrical portion 16a is lined up in rows at an angle "a" relative to a plane that perpendicularly intersects the axial center of the cylindrical portion 16a as it is wound onto the cylindrical portion 16a. Then, as shown in FIG. 10, when the first layer of the winding is finished, a second layer is lined up in rows at an angle "b" relative to the plane that perpendicularly intersects the axial center as it is wound onto the cylindrical portion 16a. In this way, the field winding 15 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 15 is saturated with varnish. For example, when a field winding 15 is wound onto the cylindrical portion 16a of a bobbin 16 with an outer diameter of 40 to 60 mm, the outermost diametric dimension of the multi-layered portion on which the outer circumferential tape 17c is wound is approximately 70 to 90 mm.

In the rotor 1 constructed in this manner, centrifugal force acts constantly on the field winding 15 during power generation, and even slight gaps and looseness are gradually enlarged, leading to disarray in the winding. Thus, in order to achieve winding without gaps or looseness, it is usual to apply tension to the wire as it is wound onto the bobbin 16, and with respect to the configuration of the start of the winding, to line up the winding in rows at an angle relative to the plane which perpendicularly intersects the axial center as shown in FIG. 9.

Figure 11:
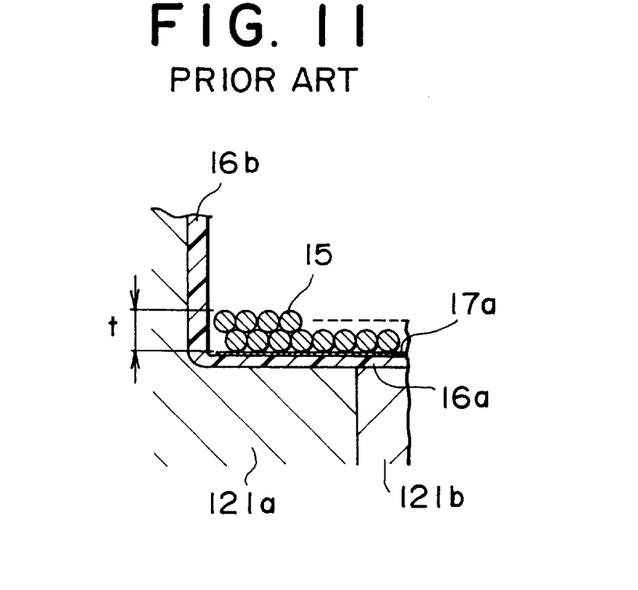
FIG. 11 is a partial cross-section explaining the wound condition of a portion of the field winding in the conventional rotor for an automotive alternator.
Figure 12:
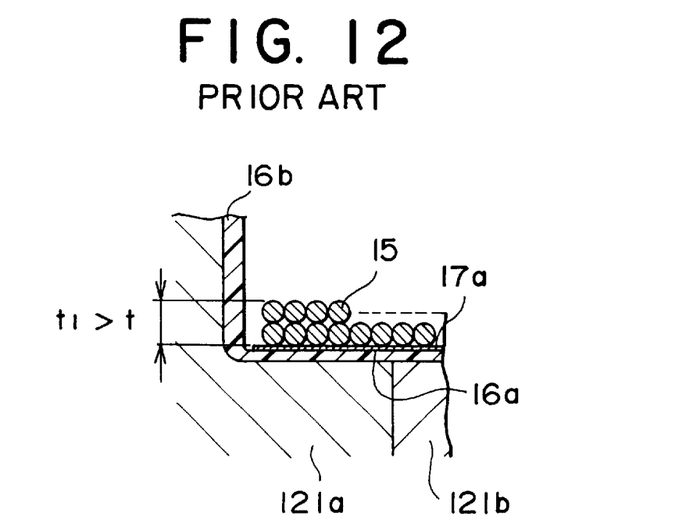
FIG. 12 is a partial cross-section explaining the wound condition of another portion of the field winding in the conventional rotor for an automotive alternator.

In the field winding 15 wound in this manner, the winding in the second layer, for example, is wound on top of the winding in the first layer with the angle reversed. Thus, the winding configuration in the field winding 15 assumes a first condition in which the portions of wire in the second layer are positioned in the exact center between the adjacent portions of wire in the first layer (condition in FIG. 11 which is a cross-section taken along line Q—Q in FIG. 10), a second condition in which the largest diameter portions of the wire in the first layer and the wire in the second layer are stacked radially (condition in FIG. 12 which is a cross-section taken along line P—P in FIG. 10), and intermediate conditions which gradually shift from the first condition to the second condition or from the second condition to the first condition. At that time, the height t1 of the two layers in the second condition is greater than the height t of the two layers in the first condition.

In a conventional rotor for an automotive alternator constructed in this manner, the field winding 15, which has a circular cross-section, is wound onto the bobbin 16 at an angle to a plane which perpendicularly intersects the axial center, and therefore a first condition in which the portions of wire in the nth+1 layer are positioned in the exact center between the adjacent portions of wire in the nth layer, a second condition in which the largest diameter portions of the wire in the nth layer and the wire in the nth+1 layer are stacked radially, and intermediate conditions which gradually shift between those conditions.

Thus, one problem is that radial irregularities invariably arise within each lap of the field winding 15 and the configuration of the multi-layered portion thereof consequently has eccentricities, which increases vibrations during high-speed rotation, leading to bending of the rotating shaft 11 or disconnection of the winding connections.

Another problem is that the space factor in the multi-layered portion reaches a peak, precluding increases in output.

An additional problem is that portions of wire in the second condition are in contact with other portions at points, making resistance to vibrations poor and giving rise to disarray in the winding. By touching the root portions of the claw-shaped magnetic poles 122a, 122b, the outside of the multi-layered portion of the field winding 15 serves the role of damping axial vibrations in the claw-shaped magnetic poles 122a, 122b, and therefore disarray in the winding leads to increased electromagnetic noise.

SUMMARY OF THE INVENTION

The present invention aims to solve the above problems and an object of the present invention is to provide a rotor for an automotive alternator enabling elimination of eccentricities in the multi-layered portion of the field winding and reduction of vibrations during high-speed rotation, and enabling increases in space factor, increases in output, increases in rigidity, and reductions in electromagnetic noise, by winding a flattened field winding onto the bobbin with the flat surfaces as the inner circumferential surface and the outer circumferential surface relative to the radial direction.

In order to achieve the above object, according to one aspect of the present invention, there is provided a rotor for an automotive alternator comprising a pair of field cores each having a cylindrical base portion and a plurality of claw-shaped magnetic poles projecting from the outer circumferential edges of the base portions, the field cores being secured to a rotating shaft facing each other such that the end surfaces of the base portions are in close contact with each other and the claw-shaped magnetic poles intermesh with each other; a cylindrical bobbin having a cylindrical portion and a pair of first and second annular flange portions projecting perpendicularly from both ends of the cylindrical portion, the bobbin being fitted over the base portions of the pair of field cores; and a field winding wound a predetermined number of turns into multiple layers on the cylindrical portion of the bobbin, wherein the field winding has a flat shape in which a pair of opposite flat surfaces are parallel, the field winding being wound onto the cylindrical portion of the bobbin such that the pair of opposite flat surfaces face the inner circumferential side and the outer circumferential side, respectively, relative to the radial direction.

DETAILED DESCRIPTION OF THE PREFERRED EMBODIMENTS

The preferred embodiments of the present invention will now be explained with reference to the drawings.

EMBODIMENT 1

Figure 1:
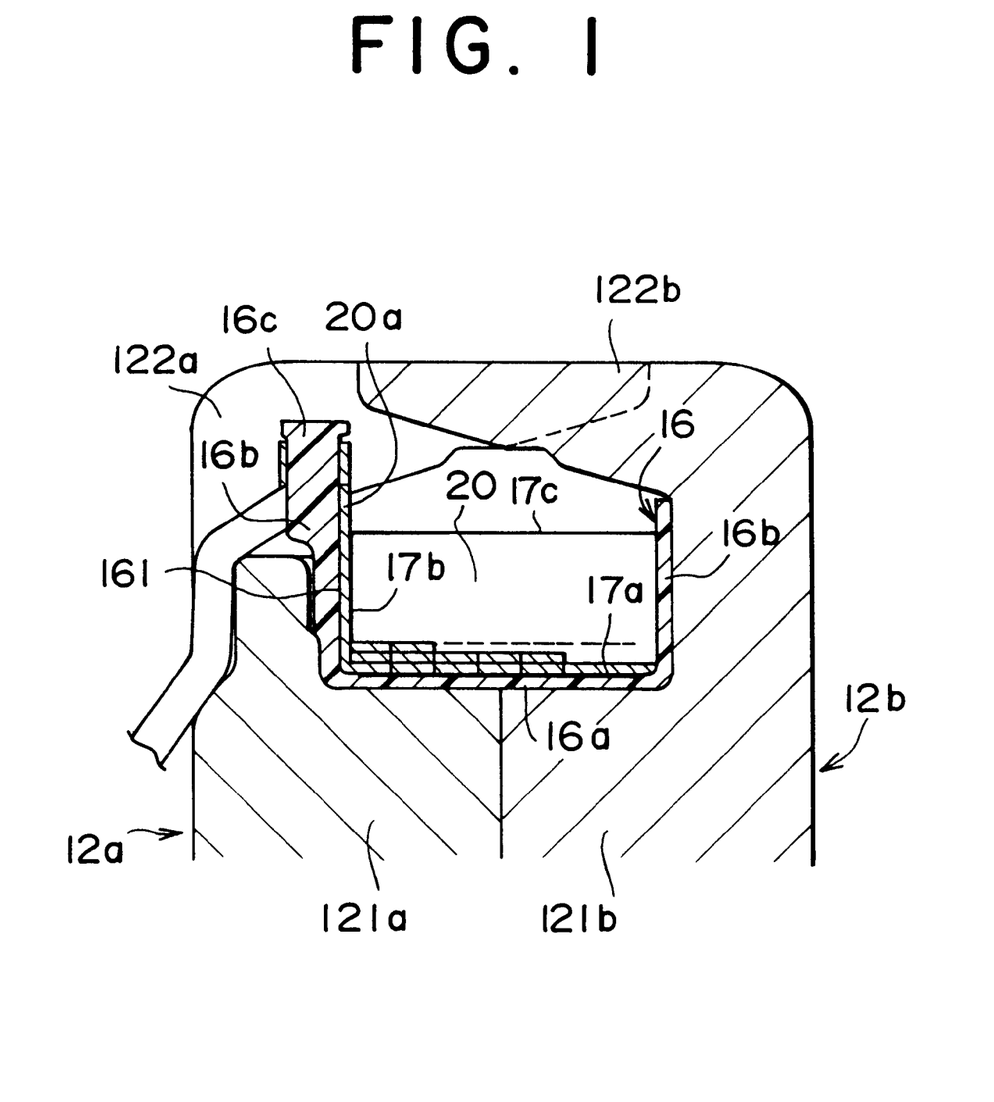
FIG. 1 is a partial cross-section of a rotor for an automotive alternator according to Embodiment 1 of the present invention.
Figure 2:
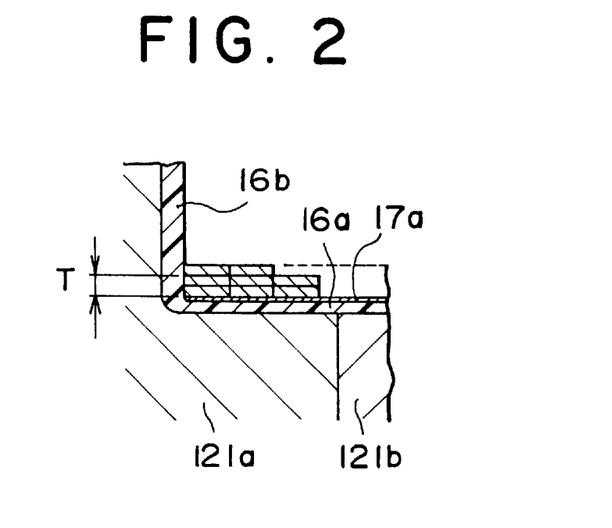
FIG. 2 is a partial cross-section explaining the wound condition of a portion of a field winding in the rotor for an automotive alternator according to Embodiment 1 of the present invention.
Figure 3:
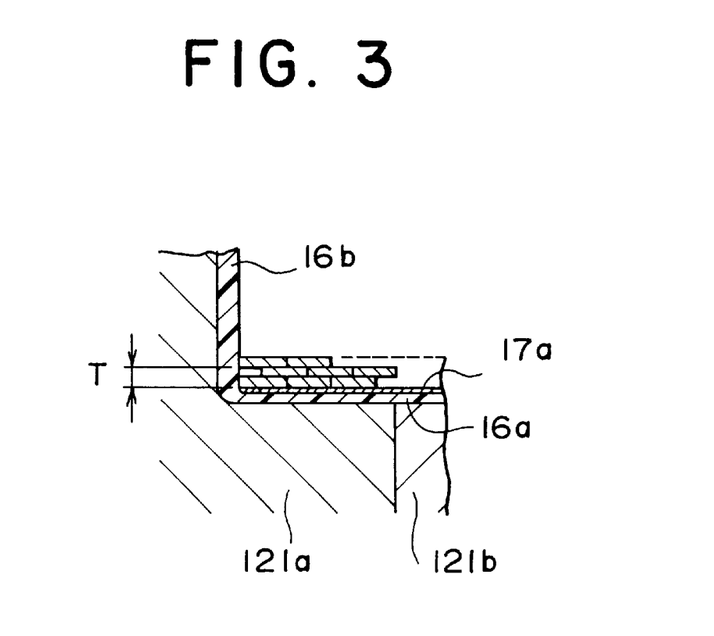
FIG. 3 is a partial cross-section explaining the wound condition of another portion of the field winding in the rotor for an automotive alternator according to Embodiment 1 of the present invention.

FIG. 1 is a partial cross-section of a rotor for an automotive alternator according to Embodiment 1 of the present invention, and FIGS. 2 and 3 are partial cross-sections explaining the wound conditions of portions of a field winding in the rotor for an automotive alternator according to Embodiment 1 of the present invention.

In FIG. 1, a field winding 20 is formed from copper wire having a rectangular cross-section that is a flat shape in which a pair of opposite flat surfaces are parallel and the field winding 20 has the same cross-sectional area as the conventional field winding 15 which has a circular cross-section.

The starting portion of this field winding 20 is wound around an anchor portion 16c on the bobbin 16, then inserted into a recessed groove 161, and thereafter drawn from the inner circumferential end of the recessed groove 161 onto the cylindrical portion 16a on which an inner circumferential tape 17a is wound. At this point, side tape 17b is pasted onto the inner wall of a first flange portion 16b so as to cover the lead wire 20a at the start of the field winding 20 which is housed in the recessed groove 161. Then, the field winding 20 drawn out onto the cylindrical portion 16a is lined up in rows at a prescribed angle relative to the plane which perpendicularly intersects the axial center of the cylindrical portion 16a as it is wound onto the cylindrical portion 16a from the first flange portion 16b to a second flange portion 16b. The field winding 20 is wound onto the cylindrical portion 16a such that the pair of parallel flat surfaces face each other relative to the radial direction of the cylindrical portion 16a. Then, when a first layer of winding is finished, a second layer is lined up in rows at a prescribed angle relative to the plane which perpendicularly intersects the axial center in the opposite direction to that of the first layer as it is wound onto the cylindrical portion 16a from the second flange portion 16b back to the first flange portion 16b. In this way, the field winding 20 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 20 is saturated with varnish.

Moreover, the rest of the construction is the same as for the conventional rotor shown in FIGS. 6 to 8.

The winding configuration of the field winding 20 assumes a first condition in which the portions of wire in the nth+1 layer are positioned in the exact center between the adjacent portions of wire in the nth layer (condition in FIG. 3), a second condition in which the axial surfaces of the wire in the nth layer and the wire in the nth+1 layer are radially overlapped each other across the entire region in the axial direction (condition in FIG. 2), and intermediate conditions which gradually shift from the first condition to the second condition or from the second condition to the first condition. Since the field winding 20 has a rectangular cross-section, the field winding 20 is wound with the radially inner circumferential side of the winding in the nth+1 layer in surface contact with the radially outer circumferential side of the winding in the nth layer, and the height T of any two layers in the second condition is the same as the height T of any two layers in the first condition. The height of any two layers in the intermediate conditions is also T.

Moreover the height T of any two layers of the field winding 20 is less than the height t of any two layers of the field winding 15.

In this manner, according to Embodiment 1, the field winding 20 has a rectangular cross-section, enabling the flat surface of the inner circumferential side of the wire in the nth+1 layer to be in surface contact with the flat surface of outer circumferential side of the wire in the nth layer across the entire region of the cylindrical portion 16a.

Thus, dispersion of diameter of the multi-layered portion in the axial direction of the bobbin is reduced and therefore the multi-layered portion of the field winding 20 can be formed with a uniform diameter without eccentricities. As a result, rotor vibrations induced during high-speed rotation can be suppressed, preventing bending of the rotating shaft 11 and disconnection of the winding connections resulting therefrom. In other words, strength is increased with respect to high-speed rotation.

Also, spacing between portions of the field winding 20 in the radial direction is practically reduced to zero, increasing rigidity, improving resistance to vibrations, and enabling the occurrence of disarray in the winding to be suppressed. Thus, the dumper function of the multi-layer portion is improved, effectively reducing axial vibrations in the claw-shaped magnetic poles 122a, 122b and enabling electromagnetic noise to be reduced.

Furthermore, thermal conductivity between portions of the field winding 20 is improved and radiation of heat increases, enabling high-output to be attained. In other words, the field winding is wound to a high density, enabling a compact, high-output multi-layered portion to be obtained. The thickness of the field winding 20 is small (compared to the outer diameter of the conventional field winding 15), making it possible to wind more coils onto a bobbin of the same size.

In addition, static frictional forces between portions of the field winding 20 and between the field winding 20 and the bobbin 16 are increased, preventing the field winding 20 from slipping.

EMBODIMENT 2

Figure 4:
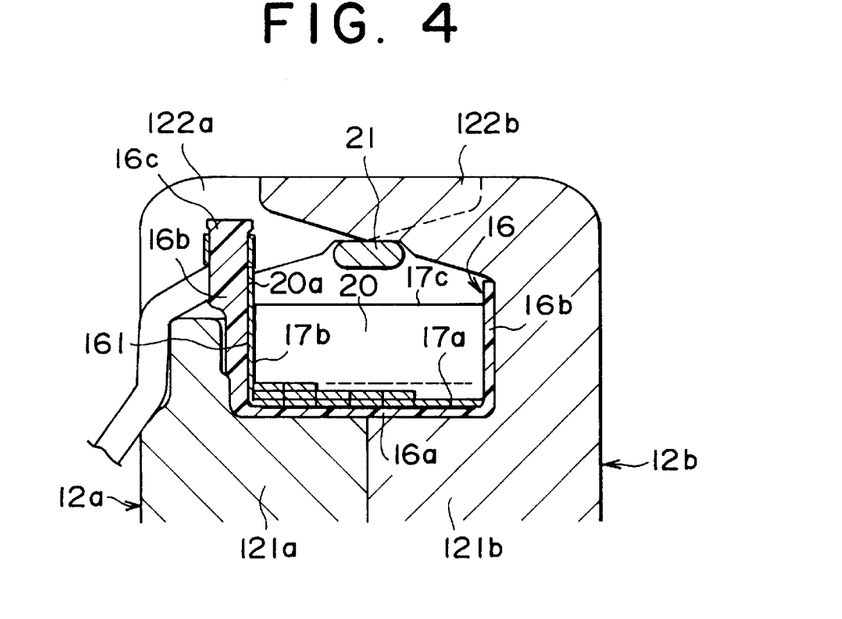
FIG. 4 is a partial cross-section of a rotor for an automotive alternator according to Embodiment 2 of the present invention.

In Embodiment 2, a vibration-suppressing iron ring 21 is fitted into an inner circumferential portion of the claw-shaped magnetic poles 122a, 122b as shown in FIG. 4.

Moreover, the rest of the construction is the same as for Embodiment 1.

In a conventional rotor, a field winding 15 with a circular cross-section is used and therefore, if the number of turns in the field winding 15 wound onto the bobbin 16 is increased in order to obtain high output, the outer diameter of the multi-layered portion increases, leaving no space to mount the vibration-suppressing ring 21. Conversely, if space is to be procured to mount the vibration-suppressing ring 21, the number of turns in the field winding 15 wound onto the bobbin 16 must be decreased, and therefore high output cannot be obtained.

However, in Embodiment 2, the field winding 20 can be wound to a high density as in Embodiment 1, enabling the size of the multi-layered portion to be reduced. Thus, space can be procured between the multi-layered portion and the claw-shaped magnetic poles 122a, 122b without reducing output, making it possible to mount the vibration-suppressing ring 21.

Consequently, according to Embodiment 2, in addition to the effects of Embodiment 1, a vibration-suppressing ring 21 is mounted, and therefore the rigidity of the claw-shaped magnetic poles 122a, 122b is increased, effectively reducing axial vibrations in the claw-shaped magnetic poles 122a, 122b and enabling electromagnetic noise to be reduced further.

EMBODIMENT 3

Figure 5:
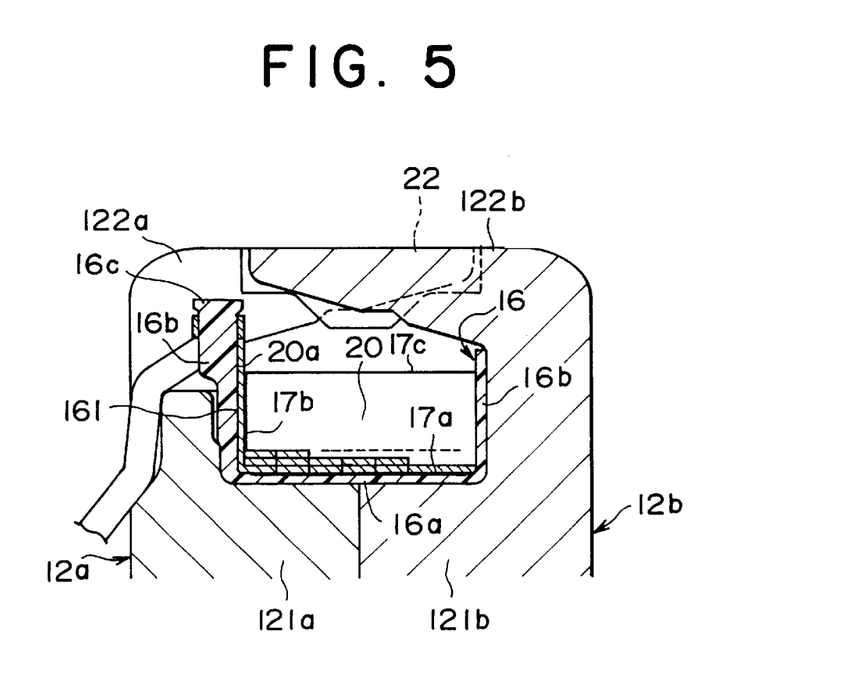
FIG. 5 is a partial cross-section of a rotor for an automotive alternator according to Embodiment 3 of the present invention.

In Embodiment 3, output enhancing permanent magnets 22 are fitted between each of the claw-shaped magnetic poles 122a, 122b as shown in FIG. 5.

Moreover, the rest of the construction is the same as for Embodiment 1.

The permanent magnets 22 fitted between each of the claw-shaped magnetic poles 122a, 122b are exposed to the heat generated by power generation and, therefore, it is necessary to form cooling space for cooling the permanent magnets 22.

In a conventional rotor, a field winding 15 with a circular cross-section is used and therefore, if space is to be procured between the multi-layered portion and the claw-shaped magnetic poles 122a, 122b, the number of turns in the field winding 15 wound onto the bobbin 16 must be decreased, and therefore high output cannot be obtained.

However, in Embodiment 3, the field winding 20 can be wound to a high density as in Embodiment 1, enabling the size of the multi-layered portion to be reduced. Thus, cooling space can be procured between the multi-layered portion and the claw-shaped magnetic poles 122a, 122b without reducing the number of turns in the field winding 20 wound onto the bobbin 16, that is, without reducing output, making it possible to mount the permanent magnets 22.

Consequently, according to Embodiment 3, in addition to the effects of Embodiment 1, permanent magnets 22 are mounted, enabling high-output to be obtained as well as increasing the rigidity of the claw-shaped magnetic poles 122a, 122b, effectively reducing axial vibrations in the claw-shaped magnetic poles 122a, 122b and enabling electromagnetic noise to be reduced further.

Moreover, in Embodiment 3, the permanent magnets 22 have been fitted separately between each of the claw-shaped magnetic poles 122a, 122b, but the permanent magnets 22 fitted between each of the claw-shaped magnetic poles 122a, 122b may be joined and integrated. In that case, because the permanent magnets 22 are joined and integrated, the rigidity of the claw-shaped magnetic poles 122a, 122b is increased, enabling electromagnetic noise to be reduced even further.

Furthermore, in each of the above embodiments, a field winding 20 with a rectangular cross-section is used, but the field winding is not limited to a rectangular cross-section, and may be any flat shape in which a pair of opposite flat surfaces are parallel, for example, an athletics track-shaped cross-section in which the upper and lower surfaces are parallel and the both end surfaces are convex.

The present invention is constructed in the above manner and exhibits the effects described below.

According to one aspect of the present invention, there is provided a rotor for an automotive alternator comprising a pair of field cores each having a cylindrical base portion and a plurality of claw-shaped magnetic poles projecting from the outer circumferential edges of the base portions, the field cores being secured to a rotating shaft facing each other such that the end surfaces of the base portions are in close contact with each other and the claw-shaped magnetic poles intermesh with each other; a cylindrical bobbin having a cylindrical portion and a pair of first and second annular flange portions projecting perpendicularly from both ends of the cylindrical portion, the bobbin being fitted over the base portions of the pair of field cores; and a field winding wound a predetermined number of turns into multiple layers on the cylindrical portion of the bobbin, wherein the field winding has a flat shape in which a pair of opposite flat surfaces are parallel, the field winding being wound onto the cylindrical portion of the bobbin such that the pair of opposite flat surfaces face the inner circumferential side and the outer circumferential side, respectively, relative to the radial direction, enabling the provision of a rotor for an automotive alternator enabling elimination of eccentricities in the multi-layered portion of the field winding and reduction of vibrations during high-speed rotation, and enabling increases in space factor, increases in output, increases in rigidity, and reductions in electromagnetic noise.

A vibration-suppressing ring is fitted on the inner circumference of the claw-shaped magnetic poles of the pair of field cores, effectively reducing axial vibrations in the claw-shaped magnetic poles and enabling electromagnetic noise to be reduced without reducing output.

Permanent magnets are fitted between the claw-shaped magnetic poles of the pair of field cores, enabling high-output to be obtained as well as increasing the rigidity of the claw-shaped magnetic poles, effectively reducing axial vibrations in the claw-shaped magnetic poles and enabling electromagnetic noise to be reduced.

What is claimed is:

1. A rotor for an automotive alternator comprising:

a pair of field cores each having a cylindrical base portion and a plurality of claw-shaped magnetic poles projecting from outer circumferential edges of said base portions, said field cores are secured to a rotating shaft facing each other wherein end surfaces of said base portions are in close contact with each other and said claw-shaped magnetic poles intermesh with each other;

a cylindrical bobbin having a cylindrical portion and a pair of first and second annular flange portions projecting perpendicularly from both ends of said cylindrical portion, said bobbin being fitted over said base portions of said pair of field cores;

a field winding wound a predetermined number of turns into multiple layers on said cylindrical portion of said bobbin of said rotor; and a recessed groove formed in an inner surface of said first annular flange portion from an outer circumferential end of said first annular flange portion to an inner circumferential end thereof, wherein said field winding has a flat rectangular shape in which a pair of opposite flat surfaces are parallel, said field winding is wound onto said cylindrical portion of said bobbin wherein said pair of opposite flat surfaces face each other, relative to a radial direction of said cylindrical portion, said bobbin is formed to have a field winding mounting portion in which a radial length thereof is shorter than an axial length thereof, and a starting portion of said field winding is housed in said recessed groove so as to make said opposite flat surfaces square with an axis of said bobbin.

2. The rotor for an automotive alternator according to claim 1, wherein a vibration-suppressing ring is fitted on the inner circumference of said claw-shaped magnetic poles of said pair of field cores.

3. The rotor for an automotive alternator according to claim 1, wherein permanent magnets are fitted between said claw-shaped magnetic poles of said pair of field cores.

* * * * *